(12) United States Patent
Adkins et al.

(10) Patent No.: US 7,702,662 B2
(45) Date of Patent: Apr. 20, 2010

(54) METHOD AND SYSTEM FOR HANDLING REALLOCATED BLOCKS IN A FILE SYSTEM

(75) Inventors: Janet Elizabeth Adkins, Austin, TX (US); Joon Chang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 11/749,614

(22) Filed: May 16, 2007

(65) Prior Publication Data
US 2008/0288546 A1 Nov. 20, 2008

(51) Int. Cl.
*G06F 12/00* (2006.01)

(52) U.S. Cl. .................. 707/204; 707/205; 711/161; 711/162; 711/170

(58) Field of Classification Search .......... None
See application file for complete search history.

(56) References Cited

U.S. PATENT DOCUMENTS

| | | | |
|---|---|---|---|
| 4,507,751 A | 3/1985 | Gawlick et al. |
| 5,043,871 A | 8/1991 | Nishigaki et al. |
| 5,086,502 A | 2/1992 | Malcolm |
| 5,210,866 A | 5/1993 | Milligan et al. |
| 5,369,757 A | 11/1994 | Spiro et al. |
| 5,454,099 A | 9/1995 | Myers et al. |
| 5,684,991 A | 11/1997 | Malcolm |
| 5,713,024 A | 1/1998 | Halladay |
| 5,758,067 A | 5/1998 | Makinen et al. |
| 5,765,173 A | 6/1998 | Cane et al. |
| 5,819,292 A | 10/1998 | Hitz et al. |
| 5,854,896 A | 12/1998 | Brenner et al. |
| 5,924,102 A | 7/1999 | Perks |

(Continued)

FOREIGN PATENT DOCUMENTS

WO 9848626 11/1998

OTHER PUBLICATIONS

Duvall et al., "Database Server Journal Backup Automation Technique", IBM Technical Disclosure Bulletin, Feb. 1993, pp. 463-464.

(Continued)

*Primary Examiner*—James Trujillo
*Assistant Examiner*—Albert Phillips
(74) *Attorney, Agent, or Firm*—Yee & Associates, P.C.; Matthew W. Baca

(57) ABSTRACT

A system for managing a file system. In response to a user selecting an image of the file system to perform a rollback operation, each data block in the file system that is owned by the image is searched for. Then, it is determined whether a data block owned by the image is marked in a first map and a second map. In response to determining that the data block owned by the image is marked in the first map and the second map, the data block is marked in a third map. In response to determining that the data block owned by the image is marked in the third map, a new data block is allocated in the file system. Subsequently, data from the data block owned by the image is copied to the new data block in the file system prior to performing the rollback operation to avoid a collision that causes data corruption.

16 Claims, 6 Drawing Sheets

U.S. PATENT DOCUMENTS

| | | | |
|---|---|---|---|
| 5,978,565 | A | 11/1999 | Ohran et al. |
| 6,038,639 | A | 3/2000 | O'Brien et al. |
| 6,108,749 | A | 8/2000 | White et al. |
| 6,122,629 | A | 9/2000 | Walker et al. |
| 6,205,527 | B1 | 3/2001 | Goshey et al. |
| 6,205,558 | B1 | 3/2001 | Sobel |
| 6,286,011 | B1 | 9/2001 | Velamuri et al. |
| 6,397,308 | B1 | 5/2002 | Ofek et al. |
| 6,477,629 | B1 | 11/2002 | Goshey et al. |
| 6,484,186 | B1* | 11/2002 | Rungta ................. 707/203 |
| 6,490,690 | B1 | 12/2002 | Gusler et al. |
| 6,496,944 | B1 | 12/2002 | Hsiao et al. |
| 6,564,235 | B1 | 5/2003 | Otsuka et al. |
| 6,584,583 | B2 | 6/2003 | Nam |
| 6,615,225 | B1 | 9/2003 | Cannon et al. |
| 6,714,951 | B2 | 3/2004 | Bills et al. |
| 6,792,518 | B2* | 9/2004 | Armangau et al. .......... 711/162 |
| 6,907,507 | B1* | 6/2005 | Kiselev et al. .............. 711/162 |
| 6,912,631 | B1* | 6/2005 | Kekre et al. ................ 711/162 |
| 6,996,580 | B2 | 2/2006 | Bae et al. |
| 7,039,663 | B1 | 5/2006 | Federwisch et al. |
| 7,284,019 | B2 | 10/2007 | Adkins et al. |
| 7,440,966 | B2 | 10/2008 | Adkins et al. |
| 7,454,445 | B2* | 11/2008 | Lewis et al. ................ 707/205 |
| 7,472,138 | B2 | 12/2008 | Adkins et al. |
| 2003/0163493 | A1 | 8/2003 | Burns et al. |
| 2003/0182301 | A1 | 9/2003 | Patterson et al. |
| 2003/0182389 | A1 | 9/2003 | Edwards |
| 2003/0191911 | A1 | 10/2003 | Kleinschnitz et al. |
| 2004/0103104 | A1 | 5/2004 | Hara et al. |
| 2004/0117572 | A1 | 6/2004 | Welsh et al. |
| 2004/0153923 | A1 | 8/2004 | Goel et al. |
| 2004/0225689 | A1 | 11/2004 | Dettinger et al. |
| 2005/0081099 | A1 | 4/2005 | Chang et al. |
| 2005/0097260 | A1 | 5/2005 | McGovern et al. |
| 2005/0182797 | A1 | 8/2005 | Adkins et al. |
| 2005/0210073 | A1 | 9/2005 | Oeda et al. |
| 2006/0041727 | A1 | 2/2006 | Adkins et al. |
| 2006/0129611 | A1 | 6/2006 | Adkins et al. |
| 2006/0259949 | A1 | 11/2006 | Schaefer et al. |
| 2008/0133863 | A1* | 6/2008 | Boggs et al. ................ 711/170 |
| 2008/0155548 | A1 | 6/2008 | Dettinger et al. |

OTHER PUBLICATIONS

Duvall et al., "Database Server Journaling Recursion Heuristic", IBM Technical Disclosure Bulletin, Feb. 1993, pp. 13-14.

Shaffer, "Generating Symptom Strings for AIX System Dumps", IBM Technical Disclosure Bulletin, Oct. 1995, pp. 219-220.

Qian et al., "Optimal Backup Policies for a Database System with Incremental Backup", published online Jan. 4, 2002, Electronics and Communications in Japan (PARTIII: Fundamental Electronic Science), vol. 85, Issue 4, Abstract.

Nakamura et al., "Optimal Full Backup Intervals for the Incremental Backup Method", Abstract, IEICE Transactions on Information and Systems, Pt 1, (Japanese Edition).

Levine, "Page Inconsistency Recovery and Avoidance", IBM Technical Disclosure Bulletin, Mar. 1989, pp. 1-2.

Cox et al., "Pastiche: Making Backup Cheap and Easy", USENIX Association 5th Symposium on Operating Systems Design and Implementation, 2002, pp. 285-298.

Lee et al., "Petal: Distributed Virtual Disks", ASPLOS VII 10/96 1996 pp. 84-92.

* cited by examiner

METHOD AND SYSTEM FOR HANDLING REALLOCATED BLOCKS IN A FILE SYSTEM

BACKGROUND OF THE INVENTION

1. Field of the Invention

The present invention relates generally to an improved data processing system. More specifically, the present invention is directed to a computer implemented method, system, and computer usable program code for managing a file system within the data processing system.

2. Description of the Related Art

A file system is a mechanism for storing and retrieving files on a hard disc drive. A file system defines the directory structure for keeping track of the files and the path syntax required to access the files. Also, the file system defines the way files are named, as well as the maximum file size. Generally, a file system consists of two distinct parts, a collection of files and a directory structure. Each file in the collection of files stores related data. The directory structure organizes and provides information about the files in the file system.

An important function of a system that supports the file system is backup support. For example, a snapshot function of an operating system maintains a read-only copy that reflects the state of the file system at the point in time the snapshot was created. In particular, a file system snapshot establishes a consistent block level image of the blocks of the file system at a particular point in time. A file system block is a group of data that is transmitted or processed together at the same time. A block may also be referred to as a data block.

The snapshot is used to create backups for an active file system. The snapshot copies modified and deleted blocks, which were in-use in the file system at the point in time the snapshot was created, in order to maintain a point in time image of the file system. As a result, the snapshot may be used to return the file system back to a previous point in time image of the file system. This operation is called a rollback operation.

A file system block that is modified and then released results in the point in time image of the block being copied to a new location by the snapshot, which is a copy on write operation. Then, a snapshot map marks the block as copy on delete when the block is released. When a file system block is unallocated, the block may be reallocated to a different file system object. When a snapshot exists in the file system, itself, the reallocated blocks may be allocated to the snapshot. When the rollback operation is performed, the preserved images of those blocks are copied back to their original location, which results in overwriting the snapshot data before the rollback completes causing data corruption.

Therefore, it would be beneficial to have an improved computer implemented method, system, and computer usable program code for handling reallocated data blocks in a file system during the rollback operation to an internal snapshot to prevent data corruption caused by collision.

SUMMARY OF THE INVENTION

Illustrative embodiments provide a computer implemented method, system, and computer usable program code for managing a file system. In response to a user selecting an image of the file system to perform a rollback operation, each data block in the file system that is owned by the image is searched for. Then, it is determined whether a data block owned by the image is marked in a first map and a second map. In response to determining that the data block owned by the image is marked in the first map and the second map, the data block is marked in a third map. In response to determining that the data block owned by the image is marked in the third map, a new data block is allocated in the file system. Subsequently, data from the data block owned by the image is copied to the new data block in the file system prior to performing the rollback operation to avoid a collision that causes data corruption.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
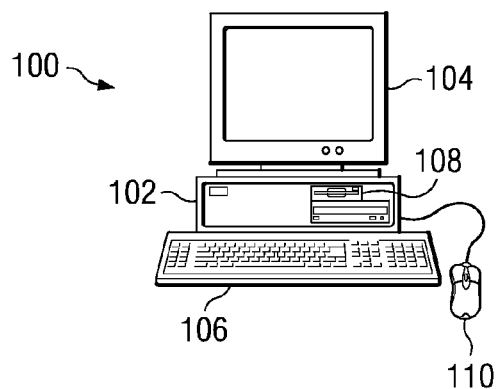
FIG. 1 is a pictorial representation of a data processing system in which illustrative embodiments may be implemented.
Figure 2:
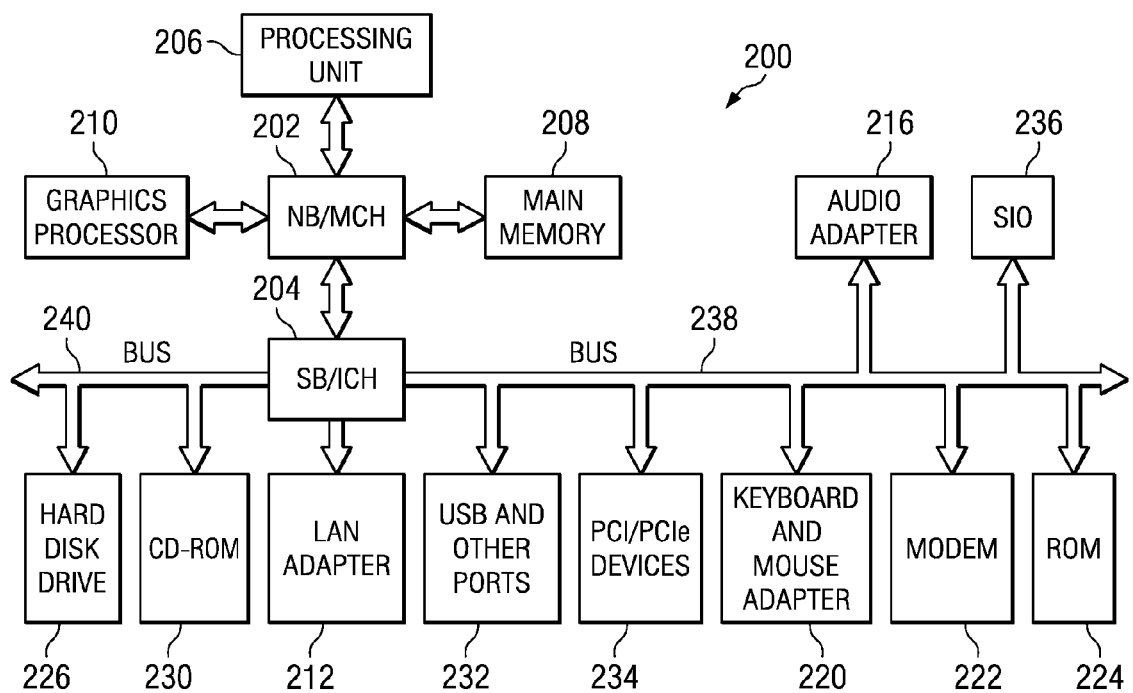
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a data processing system in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with computer 100. Examples of additional input devices may include, for example, a joystick, a touchpad, a touch screen, a trackball, and a microphone.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to NB/MCH 202. Processing unit 206 may contain one or more processors and even may be implemented using one or more heterogeneous processor systems. Graphics processor 210 may be coupled to NB/MCH 202 through an accelerated graphics port (AGP), for example.

In the depicted example, local area network (LAN) adapter 212 is coupled to SB/ICH 204, audio adapter 216, keyboard and mouse adapter 220, modem 222, read only memory (ROM) 224, universal serial bus (USB) and other ports 232. PCI/PCIe devices 234 are also coupled to SB/ICH 204 through bus 238. Hard disk drive (HDD) 226 and CD-ROM 230 are coupled to SB/ICH 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). HDD 226 and CD-ROM 230 may use, for example, an integrated drive electronics (IDE) or serial advanced technology attachment (SATA) interface. A super I/O (SIO) device 236 may be coupled to SB/ICH 204.

An OS runs on processing unit 206. This OS coordinates and controls various components within data processing system 200 in FIG. 2. The OS may be a commercially available OS, such as Microsoft® Windows XP®. Microsoft® and Windows XP® are trademarks of Microsoft Corporation in the United States, other countries, or both. An object oriented programming system, such as the Java™ programming system, may run in conjunction with the OS and provides calls to the OS from Java™ programs or applications executing on data processing system 200. Java™ and all Java™-based trademarks are trademarks of Sun Microsystems, Inc. in the United States, other countries, or both.

Instructions for the OS, the object-oriented programming system, and applications or programs are located on storage devices, such as HDD 226. These instructions and may be loaded into main memory 208 for execution by processing unit 206. The processes of the illustrative embodiments may be performed by processing unit 206 using computer implemented instructions, which may be located in a memory. An example of a memory is main memory 208, ROM 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 may be varied from the illustrative examples shown. In some illustrative examples, data processing system 200 may be a personal digital assistant (PDA). A personal digital assistant generally is configured with flash memory to provide a non-volatile memory for storing OS files and/or user-generated data. Additionally, data processing system 200 may be a tablet computer, laptop computer, or telephone device.

Other components shown in FIG. 2 may be varied from the illustrative examples shown. For example, a bus system may be comprised of one or more buses, such as a system bus, an I/O bus, and a PCI bus. Of course, the bus system may be implemented using any suitable type of communications fabric or architecture that provides for a transfer of data between different components or devices attached to the fabric or architecture. Additionally, a communications unit may include one or more devices used to transmit and receive data, such as modem 222 or LAN network adapter 212. Further, a memory may be, for example, main memory 208 or a cache such as found in NB/MCH 202. Also, a processing unit may include one or more processors or CPUs. Moreover, illustrative embodiments may be implemented in a logically partitioned data processing system.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

Illustrative embodiments provide a computer implemented method, system, and computer usable program code for managing a file system. In response to a user, such as a system administrator, selecting a point in time snapshot image of the file system to perform a rollback operation, a file system controller initializes three in-memory bitmaps. The three in-memory bitmaps are a snapshot owned data block bitmap, a copy on delete data block bitmap, and a collision bitmap.

Then, the file system controller searches for each data block in the file system that is owned by the image. After searching for each data block in the file system that is owned by the image, the file system controller marks each data block owned by the snapshot image in the snapshot owned data block bitmap and marks each copy on delete data block in the copy on delete data block bitmap. Afterward, the file system controller determines whether any of the data blocks owned by the snapshot image are marked in both the snapshot owned data block bitmap and the copy on delete data block bitmap.

In response to determining that a data block owned by the image is marked in both the snapshot owned data block bitmap and the copy on delete data block bitmap, the file system controller marks that data block in a collision bitmap. The collision bitmap identifies impending collisions in the file system prior to performance of the rollback operation. A collision is a data block that is allocated to the snapshot image and was also allocated to the point-in-time image preserved by the snapshot. In response to determining that a data block owned by the image is marked in the collision bitmap, the file system controller allocates a new data block in the file system. Subsequently, the file system controller copies data from the data block owned by the image to the new data block in the file system prior to performing the rollback operation to avoid a collision that causes data corruption.

Then, the file system controller updates a snapshot map that corresponds to the snapshot image to point to the new data block containing the data and the location of the new data block within the file system. The snapshot map includes an entry for each of the data blocks in the file system. The entry includes indications as to whether data blocks have been copied, deleted, or newly allocated. In addition, the entry includes a location address for where the data block is stored in the file system. Afterward, the rollback operation restores the file system back to a previous point in time that corresponds to the snapshot image.

Thus, data processing systems that utilize illustrative embodiments prevent corruption of data in the file system during performance of rollback operations. As a result, illustrative embodiments may save valuable time and resources of data processing systems by not requiring system administrators to recover or reconstruct data corrupted or lost during rollback.

Figure 3:
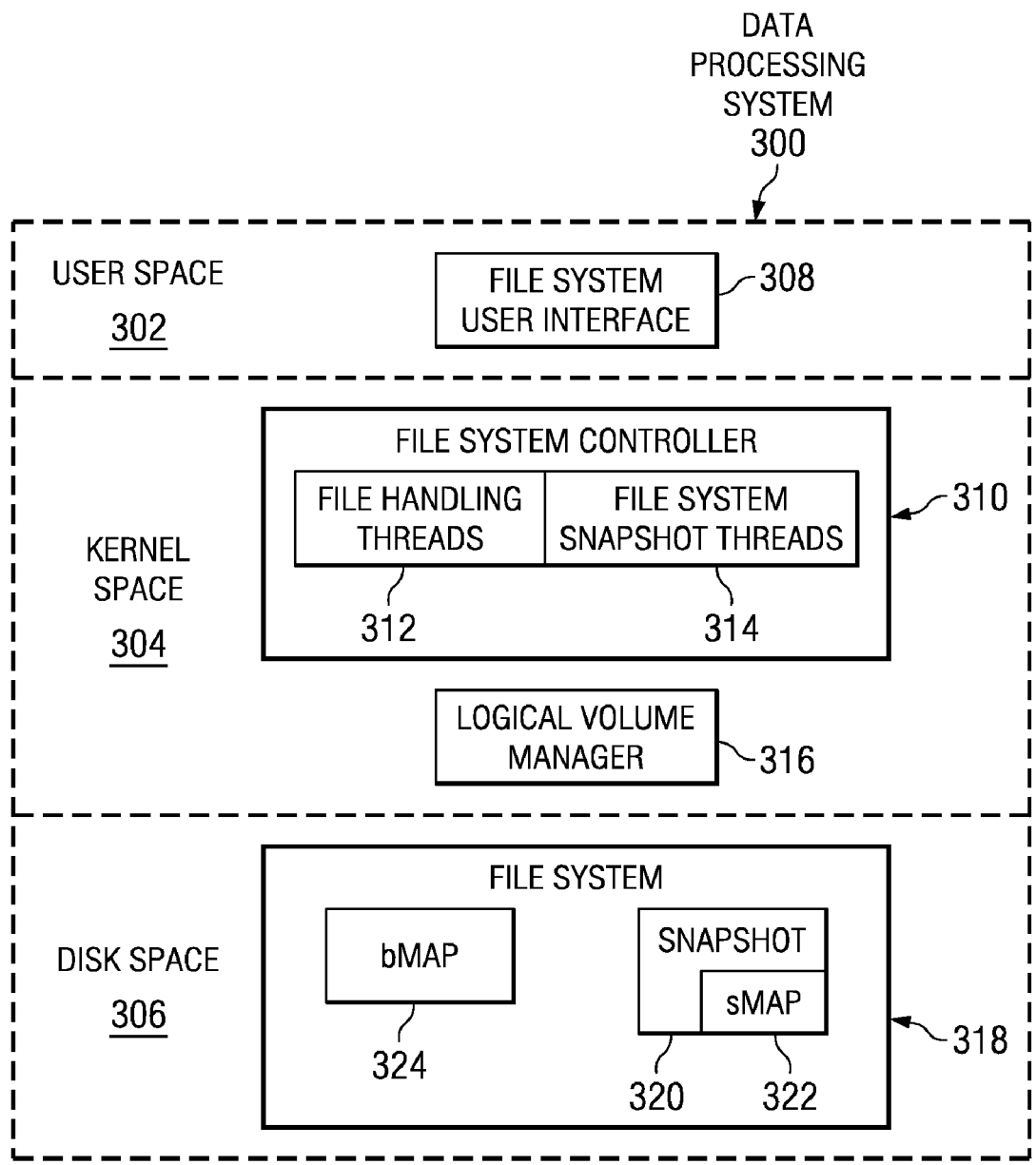
FIG. 3 is a block diagram illustrating components of a data processing system in accordance with an illustrative embodiment.

With reference now to FIG. 3, a block diagram illustrating components of a data processing system is depicted in accordance with an illustrative embodiment. Data processing system 300 may, for example, be implemented in data processing system 200 in FIG. 2. Data processing system 300 is a system for managing files in a file system on a hard disk drive, such as, for example, HDD 226 in FIG. 2. In addition, data processing system 300 also creates and manages snapshots of the file system to maintain point in time images of the file system in order to perform rollback operations. It should be noted that the term "snapshot" may also be called "file system snapshot."

Data processing system 300 includes user space 302, kernel space 304, and disk space 306. However, it should be noted that illustrative embodiments are not limited to such. Illustrative embodiments may implement more or fewer spaces and components within each space may be distributed among other spaces or among other data processing systems.

User space 302 includes file system user interface 308. File system user interface 308 receives input or commands from a user to access and control the file system. The user may utilize file system user interface 308 to, for example, create snapshots of the file system, as well as perform rollback operations to restore the file system to a previous point in time snapshot image. It should be noted that the user may be a person, such as a system administrator, or an application.

Kernel space 304 illustrates some functional components of an operating system on data processing system 300. Kernel space 304 includes file system controller 310 and logical volume manager 316. File system controller 310 is program code used to create and manage the file system, which includes creating and managing snapshots and performing rollback operations on the file system. File system controller 310 may be implemented in software, hardware, or a combination of software and hardware components.

File system controller 310 includes file handling threads 312 and file system snapshot threads 314. File system controller 310 uses file handling threads 312 for performing file system management functions and accessing data during, for example, read operations, write operations, or mount drive operations, by accessing file system 318 to locate the file or files by referencing requested data. File handling threads 312 perform these operations on data found in the file system, such as file system 318. File system controller 310 employs processes of file handling threads 312 when a user requests data access during normal file system 318 operations.

File system controller 310 uses file system snapshot threads 314 to implement processes for creating a file system snapshot, such as snapshot 320. File system controller 310 may, for example, trigger snapshot threads 314 when data in file system 318 is modified to determine whether to copy the modified data into snapshot 320. It should be noted that file system controller 310 may locate snapshot 320 on the same hard disk drive as file system 318 or may alternatively locate snapshot 320 on another storage media, such as, for example, a nonvolatile random access memory (NVRAM), another hard disc drive, or optical media.

File system controller 310 utilizes logical volume manager 316 to provide an interface between file handling threads 312 and file system snapshot threads 314 and file system 318. It should be noted that file system 318 logically files data within file system 318. In addition, it should be noted that while illustrative embodiments are described with reference to logical volume manager 316 providing an interface between an operating system kernel and a physical storage device, alternate illustrative embodiments may implement other types of data management systems for data storage and access.

Disk space 306 is a logical space on the hard disk drive. Disk space 306 includes data logically viewed as file system 318. It should be noted that file system 318 may be distributed in non-contiguous sections within disk space 306. In addition, disk space 306 may include multiple types of physical data storage media, such as, for example, a mass storage device, random access memory (RAM), and data storage devices accessible as I/O devices.

Furthermore, file system 318 includes one or more snapshots, such as snapshot 320, and data for managing the one or more snapshots, such as snapshot map (sMap) 322. Snapshot 320 contains a consistent block-level image of file system 318 at the point in time when snapshot 320 was created. Also, snapshot 320 includes a read-only copy of at least a portion of the data that was located in file system 318 at the point in time when snapshot 320 was created. SMap 322 is a map, which tracks the modification state of data blocks in the file system and tracks the addresses of allocated data blocks for snapshot 320. Data within sMap 322 describes the in-use and copied state of each data block in file system 318. It should be noted that snapshot 320 may represent a plurality of file system snapshots and that sMap 322 may include a plurality of snapshot maps associated with the plurality of file system snapshots in snapshot 320.

In establishing snapshot 320, file system controller 310 triggers one of file system snapshot threads 314 to initialize snapshot 320 for that specific point in time. The triggered file system snapshot thread blocks file handling threads 312 from writing to file system 318. In addition, the triggered file system snapshot thread initializes an empty sMap 322. Afterward, the triggered file system snapshot thread then allows file handling threads 312 to resume normal operations.

In initializing sMap 322, for example, a data structure is allocated that is proportional to the size of file system 318 at the point in time when snapshot 320 was created. Alternatively, a multi-level mapping data structure may be implemented, where only a selection of levels are initialized during snapshot 320 creation and other levels are initialized only as needed for maintaining the point in time image of file system 318.

SMap 322 maintains an entry for each block belonging to file system 318. Each entry for each of the blocks belonging to file system 318 includes multiple bits which may be marked to indicate whether a block has been copied, deleted, or newly allocated. In addition, each entry includes an address of a location at which the snapshot data is stored.

File system 318 maintains bitmap (bMap) 324, which is a file used to manage and track the allocation state of blocks within file system 318. In addition, file system controller 310 may check bMap 324 to determine whether a block was in use at the time snapshot 320 was created. Further, although not depicted in this exemplary illustration, file system 318 may include a file system directory. Alternatively, the file system directory may be maintained in kernel space 304.

When data is to be modified in file system 318, such as in copy-on-write (COW) and copy-on-delete (COD) operations, snapshot 320 is updated with data from file system 318. A data block that is to be modified in file system 318 is copied into snapshot 320 before the data block is actually modified. In addition to the data from the data block, itself, metadata describing the data block's state before the modification occurred, is copied or written into snapshot 320. Also, on-disc structure states are preserved in snapshot 320 when modifications to data blocks on file system 318 are to be made. File system controller 310 may use this metadata, as well as the other data created during runtime, for the data block in snapshot 320, to place file system 318 back into a state prior to the modification of that data block.

Figure 4:
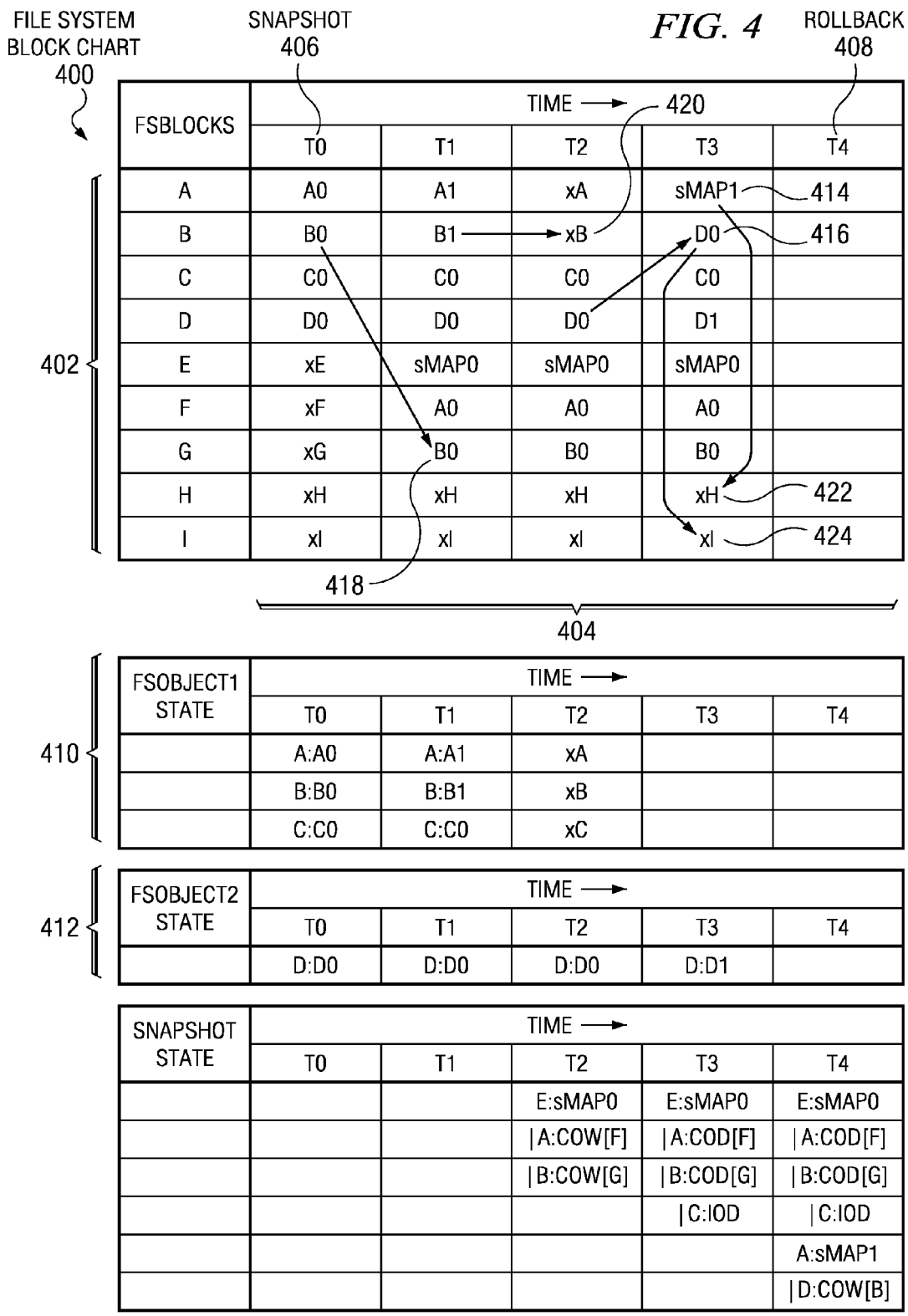
FIG. 4 is an exemplary illustration of how to prevent data corruption due to collisions that may occur during performance of a rollback operation in accordance with an illustrative embodiment.

With reference now to FIG. 4, an exemplary illustration of how to prevent data corruption due to collisions that may occur during performance of a rollback operation is depicted in accordance with an illustrative embodiment. File system block chart 400 is a chart that lists each data block in a file system, such as, for example, file system 318 in FIG. 3. File system block chart 400 includes data blocks 402 A through I and times 404 T zero through T four.

Each letter in data blocks 402 A through I represents a particular data block in the file system. A number following letters A through I in file system block chart 400 indicates a particular image for that data block. For example, A zero represents the original image of data block A at time T zero and image A one represents a modification to data block A at time T one.

An x preceding letters A through I in file system block chart 400 indicates that the data block is not currently allocated to an object or is freed. For example, xA, at time T two, indicates that data block A is currently unallocated to an object. In other words, a file system controller, such as, for example, file system controller 310 in FIG. 3, may reallocate data block A as needed to hold data for the file system.

In this illustrative example of file system block chart 400, the file system controller, in response to a user input, takes snapshot 406, such as, for example, snapshot 320 in FIG. 3, of the file system at time T zero to produce a point in time image of the file system. The point in time image of the file system at time T zero is A zero, B zero, C zero, D zero, xE, xF, xG, xH, and xI. In other words, data blocks A, B, C, and D are allocated to a file system object, whereas data blocks E, F, G, H, and I are not allocated to a file system object and are available for allocation. Also, it should be noted that in this illustrative example that the file system controller allocates data blocks A, B, and C to file system object one 410 and data block D to file system object two 412.

Further, the file system controller, in response to another user input, performs rollback 408 at time T four to restore the file system to the point in time image of snapshot 406 at time T zero. If the file system controller performs rollback 408 at time T four, without any further action by the file system controller, then a collision may occur causing data corruption.

An additional complication is introduced due to internal snapshots. The freed blocks which are not inherited are available for allocation to any file system object including the snapshots. If the block is allocated to a snapshot, this may also result in collisions when attempting to perform a rollback operation. That is, the snapshot needs to replace the before-image on top of its own meta-data, or other before-images, which the snapshot has not yet restored.

For example, the file system controller is using data block A at time T three to hold sMap one 414 of snapshot 406, itself. In addition, the file system controller is using data block B at time T three to hold a before-image for data block D 416. If the file system controller copies the before-images of either data block A or data block B back to the original location at time T zero before the file system controller processes sMap one 414, then the snapshot image will be corrupted.

As a specific example, when the file system controller creates snapshot 406 at time T zero, the original image of data block B is B zero. However, at time T one a user modifies data block B. As a result, the file system controller copies image B zero from data block B to unallocated data block G 418 prior to the file system controller modifying data block B to image B one. It should be noted that the file system controller updates the sMap each time the file system controller copies data from one data block to another data block within the file system. The sMap update includes the data block containing the copied data and the new location.

Subsequently, the user again modifies data block B by deleting the data. As a result, the file system controller marks data block B as freed or unallocated (xB) at time T two 420. Furthermore, a user modifies data block D at time T three. Consequently, the file system controller copies image D zero to unallocated data block B at time T three 416 prior to making the user modification to image D one. However, during rollback 408 to the point in time image of snapshot 406, the file system controller copies image B zero back to its home location in data block B. The file system controller copies image B zero from data block G where the file system controller copied image B zero prior to the file system controller modifying data block B to image B one.

In restoring data block B to the original image B zero, the file system controller overwrites image D zero, which was stored in data block B at time T three 416. As a result, when the file system controller attempts to restore data block D to the original image D zero at snapshot 406, the file system controller will not find image D zero to copy. Thus, a collision occurred, which caused image D zero to be corrupted.

Illustrative embodiments handle this data corruption problem by detecting the rollback command and repairing collisions before performing any of the rollback operation. The file system controller repairs the collisions by using freed space, such as freed or unallocated data blocks, in the file system to copy the affected snapshot images or data blocks before the rollback. For example, the file system controller may copy sMap one 414 to data block H 422 prior to performing rollback 408. In addition, the file system controller may copy the before-image for data block D (D zero) 416 to data block 1424 before performing rollback 408. The file system controller copies sMap one 414 and image D zero 416 to data blocks H and I, respectively, because both data blocks H and I were unallocated at time T zero when snapshot 406 was created and are still unallocated at time T four. Thus, no collision will now result during rollback 408 to the point in time image of snapshot 406.

Figure 5:
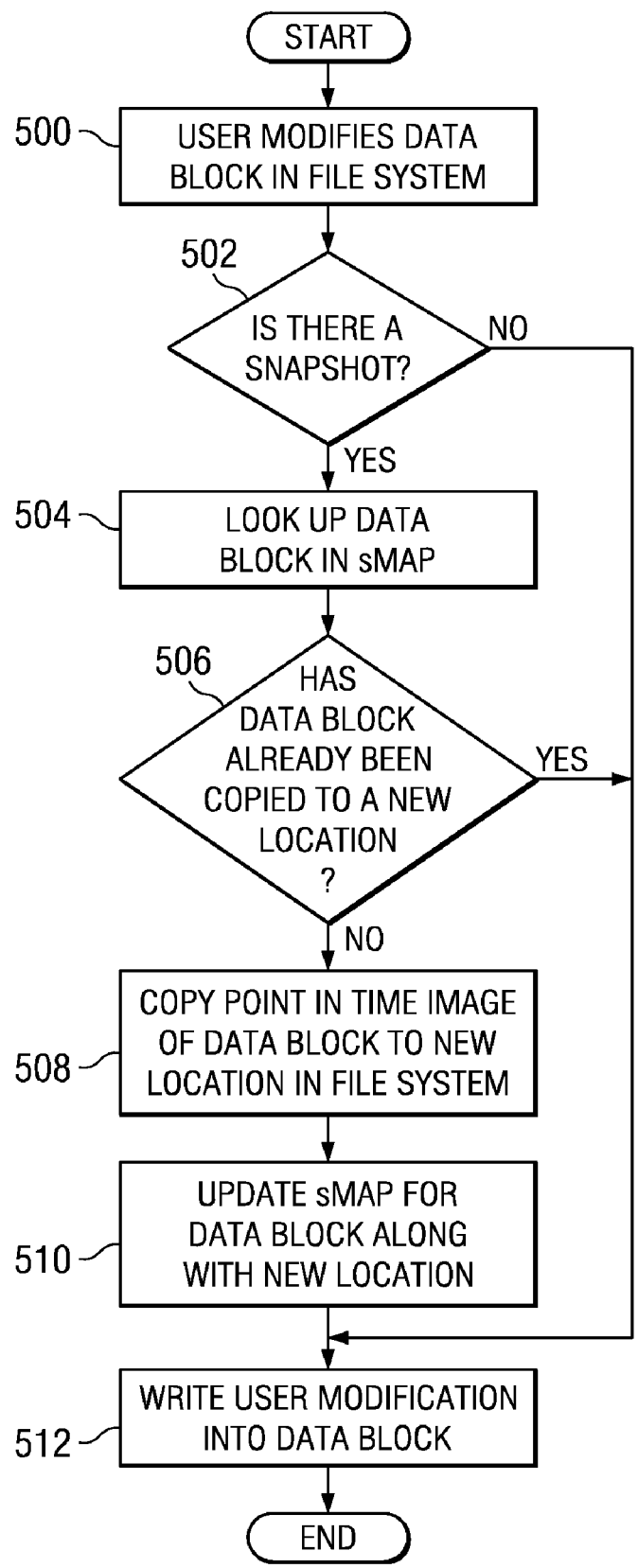
FIG. 5 is a flowchart illustrating an exemplary process for modifying a file system block in accordance with an illustrative embodiment.

With reference now to FIG. 5, a flowchart illustrating an exemplary process for modifying a file system block is shown in accordance with an illustrative embodiment. The process shown in FIG. 5 may be implemented in a file system controller, such as, for example, file system controller 308 in FIG. 3.

The process begins when a user modifies a data block in the file system, such as, for example, file system 318 in FIG. 3 (step 500). Subsequently, a file system controller, such as, for example, file system controller 310 in FIG. 3, makes a determination as to whether a snapshot of the file system, such as, for example, snapshot 406 in FIG. 4, already exists (step 502). If a snapshot does not exist, no output of step 502, then the process proceeds to step 512 where the file system controller writes the user modification into the data block. If a snapshot does exist, yes output of step 502, then the file system controller looks up the data block in an sMap, such as, for example, sMap 322 in FIG. 3 (step 504).

After looking up the data block in the sMap in step 504, the file system controller makes a determination as to whether the data block has already been copied to a new location in the file system (step 506). If the data block has already been copied to a new location, yes output of step 506, then the process proceeds to step 512 where the file system controller writes the user modification into the data block. If the data block has not already been copied to a new location, no output of step 506, then the file system controller copies a point in time image of the data block to a new location in the file system (step 508).

Then, the file system controller updates the sMap for the data block and includes the new location of the data block (step 510). Subsequent to, or concurrent with, updating the sMap in step 510, the file system controller writes the user modification into the data block (step 512). The process terminates thereafter.

Figure 6:
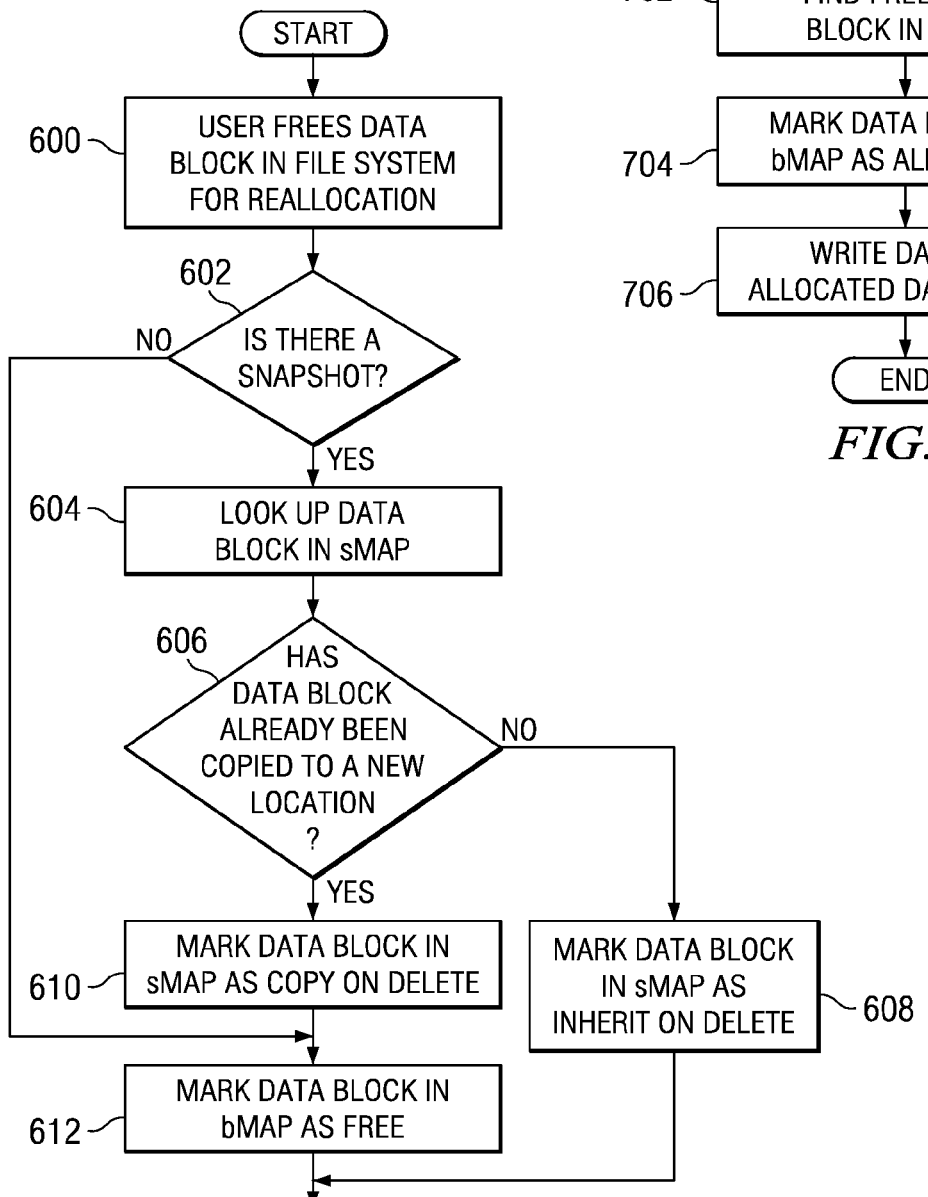
FIG. 6 is a flowchart illustrating an exemplary process for freeing a file system block for reallocation in accordance with an illustrative embodiment.

With reference now to FIG. 6, a flowchart illustrating an exemplary process for freeing a file system block for reallocation is shown in accordance with an illustrative embodiment. The process shown in FIG. 6 may be implemented in a file system controller, such as, for example, file system controller 308 in FIG. 3.

The process begins when a user frees a data block in the file system, such as, for example, file system 318 in FIG. 3, for reallocation (step 600). The user may, for example, free the data block by deleting the data in the block. Subsequently, a file system controller, such as, for example, file system controller 310 in FIG. 3, makes a determination as to whether a snapshot of the file system, such as, for example, snapshot 406 in FIG. 4, already exists (step 602). If a snapshot does not exist, no output of step 602, then the process proceeds to step 612 where the file system controller marks the data block in a bMap, such as, for example, bMap 324 in FIG. 3, as free. If a snapshot does exist, yes output of step 602, then the file system controller looks up the data block in an sMap, such as, for example, sMap 322 in FIG. 3 (step 604).

After looking up the data block in the sMap in step 604, the file system controller makes a determination as to whether the data block has already been copied to a new location in the file system (step 606). If the data block has not already been copied to a new location, no output of step 606, then the file system controller marks the data block in the sMap as inherit on delete (10D) (step 608). The process terminates thereafter. If the data block has already been copied to a new location, yes output of step 606, then the file system controller marks the data block in the sMap as copy on delete (step 610). Subsequently, the file system controller marks the data block in the bMap as free (step 612). The process terminates thereafter.

Figure 7:
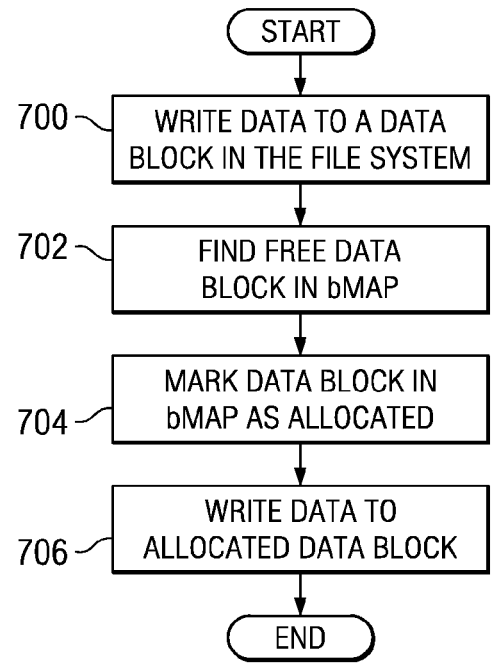
FIG. 7 is a flowchart illustrating an exemplary process for allocating a file system block in accordance with an illustrative embodiment.

With reference now to FIG. 7, a flowchart illustrating an exemplary process for allocating a file system block is shown in accordance with an illustrative embodiment. The process shown in FIG. 7 may be implemented in a file system controller, such as, for example, file system controller 308 in FIG. 3.

The process begins when the file system controller wants to write data to a data block in a file system, such as, for example, file system 318 in FIG. 3 (step 700). Subsequently, the file system controller finds a free data block in a bMap, such as, for example, bMap 322 in FIG. 3 (step 702). After finding a free data block in the bMap in step 702, the file system controller marks the free data block in the bMap as allocated (step 704). Then, the file system controller writes the data to the allocated data block (step 706). The process terminates thereafter.

Figure 8:
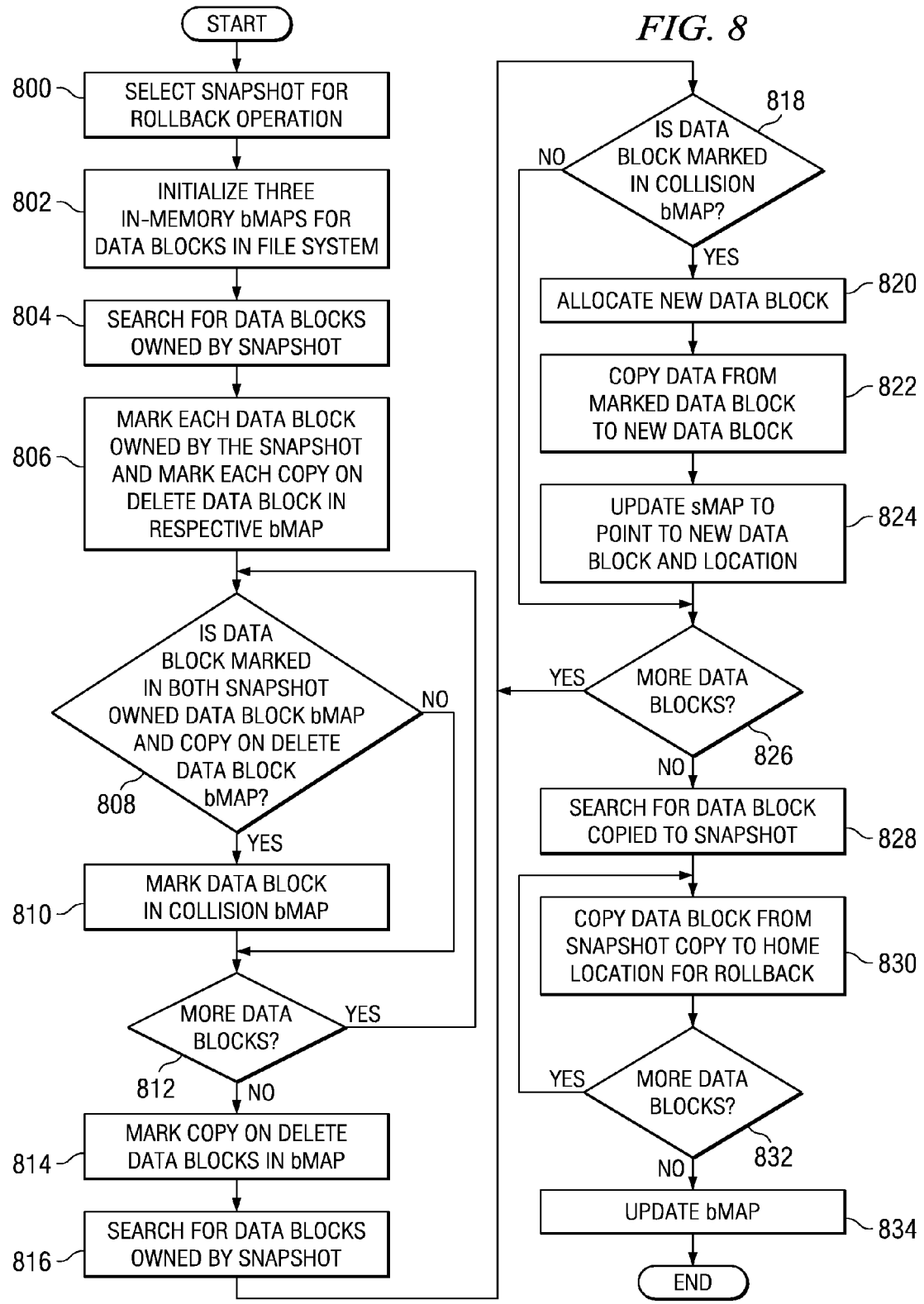
FIG. 8 is a flowchart illustrating an exemplary process for preventing collisions during rollback to a point in time snapshot image in accordance with an illustrative embodiment.

With reference now to FIG. 8, a flowchart illustrating an exemplary process for preventing collisions during rollback to a point in time snapshot image is shown in accordance with an illustrative embodiment. The process shown in FIG. 8 may be implemented in a file system controller, such as, for example, file system controller 308 in FIG. 3.

The process begins when a user, such as a system administrator, selects a point in time snapshot image of the file system, such as, for example, snapshot 406 in FIG. 4, to perform a rollback operation, such as rollback 408 in FIG. 4 (step 800). After the user selects the point in time snapshot image to rollback the file system to in step 800, the file system controller initializes three in-memory bMaps for data blocks in the file system (step 802). The three in-memory bMaps are a snapshot owned data block bMap, a copy on delete data block bMap, and a collision bMap.

Subsequent to initializing the three in-memory bMaps in step 802, the file system controller searches for data blocks owned by the snapshot image (step 804). Then, the file system controller marks each data block owned by the snapshot image in the snapshot owned data block bMap. In addition, the file system controller marks each copy on delete data block and home location in the copy on delete data block bMap (step 806). Afterward, the file system controller makes a determination as to whether a data block is marked in both the snapshot owned data block bMap and the copy on delete data block bMap (step 808).

If a data block is not marked in both the snapshot owned data block bMap and the copy on delete data block bMap, no output of step 808, then the process proceeds to step 812. If a data block is marked in both the snapshot owned data block bMap and the copy on delete data block bMap, yes output of step 808, then the file system controller marks that data block in the collision bMap (step 810). Then, the file system controller makes a determination as to whether there are more data blocks owned by the snapshot image (step 812). If there is another data block owned by the snapshot image, yes output of step 812, then the process returns to step 808 where the file system controller makes a determination as to whether that data block is marked in both the snapshot owned data block bMap and the copy on delete data block bMap. If there are no more data blocks owned by the snapshot, no output of step 812, then the file system controller marks the copy on delete data blocks in a bMap, such as, for example, bMap 324 in FIG. 3.

Subsequently, the file system controller again searches for each data block owned by the snapshot image (step 816). Afterward, the file system controller makes a determination as to whether a data block owned by the snapshot image is marked in the collision bMap (step 818). If that data block owned by the snapshot image is not marked in the collision bMap, no output of step 818, then the process proceeds to step 826. If that data block owned by the snapshot is marked in the collision bMap, yes output of step 818, then the file system controller allocates a new data block (step 820).

Subsequent to allocating the new data block in step 820, the file system controller copies data from the data block marked in the collision bMap to the new data block prior to performing the rollback operation to prevent collision and, thus, data corruption (step 822). Then, the file system controller updates an sMap, such as, for example, sMap 322 in FIG. 3, to point to the new data block and location (step 824). Afterward, the file system controller makes a determination as to whether there are more data blocks owned by the snapshot (step 826).

If there is another data block owned by the snapshot, yes output of step 826, then the process returns to step 818 where the file system controller makes a determination as to whether that data block is marked in the collision bMap. If there are no more data blocks owned by the snapshot, no output of step 826, then the file system controller searches for a data block that was copied to the snapshot image (step 828). Subsequent to searching for the data block that was copied to the snapshot image in step 828, the file system controller copies that data block from the snapshot copy to its home location at the point in time when the snapshot was created for the rollback operation (step 830).

Then, the file system controller makes a determination as to whether there are more data blocks copied to the snapshot (step 832). If there is another data block that was copied to the snapshot, yes output of step 832, then the process returns to step 830 where the file system controller copies that data block from the snapshot to its home location. If there are no more data blocks that were copied to the snapshot, no output of step 832, then the file system controller updates the bMap to track the allocation state of data blocks within the file system (step 834). The process terminates thereafter.

Thus, illustrative embodiments provide a computer implemented method, system, and computer usable program code for handling reallocated data blocks in a file system during rollback to an internal snapshot to prevent collisions that cause data corruption. The invention may take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention may take the form of a computer program product accessible from a computer-usable or computer-readable medium providing program code for use by or in connection with a computer or any instruction execution system. For the purposes of this description, a computer-usable or computer-readable medium may be any tangible apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a ROM, a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, et cetera) may be coupled to the system either directly or through intervening I/O controllers.

Network adapters also may be coupled to the system to enable the data processing system to become coupled to other data processing systems, remote printers, or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing a file system, the computer implemented method comprising:
responsive to a user selecting an image of the file system to perform a rollback operation, searching for each data block in the file system that is owned by the image;
determining that a data block owned by the image is marked in a first map and a second map;
responsive to determining that the data block owned by the image is marked in the first map and the second map, marking the data block in a third map;
responsive to determining that the data block owned by the image is marked in the third map, allocating a new data block in the file system; and
copying data from the data block owned by the image to the new data block in the file system prior to performing the rollback operation to avoid a collision that causes data corruption;
wherein the first map is a snapshot owned data block bitmap, the second map is a copy on delete data block bitmap, and the third map is a collision bitmap; and
wherein the collision bitmap identifies impending collisions in the file system prior to performance of the rollback operation.

2. The computer implemented method of claim 1, further comprising:
updating a fourth map corresponding to the image to point to the new data block in the file system and a location for the new data block.

3. The computer implemented method of claim 1, further comprising:
initializing the first map, the second map, and the third map in memory; marking data blocks owned by the image in the first map; and marking copy on delete data blocks in the second map.

4. The computer implemented method of claim 1, wherein the rollback operation restores the file system back to a previous point in time that corresponds to the image.

5. The computer implemented method of claim 1, wherein the image is a point in time snapshot image of the file system.

6. The computer implemented method of claim 3, wherein the searching, determining, marking, allocating, copying, updating, and initializing steps are performed by a file system controller.

7. The computer implemented method of claim 1, wherein the user is a system administrator.

8. The computer implemented method of claim 2, wherein the fourth map is a snapshot map.

9. The computer implemented method of claim 8, wherein the snapshot map includes an entry for each data block in the file system.

10. The computer implemented method of claim 9, wherein the entry for each data block includes multiple bits that are marked to indicate whether the data block has been copied, deleted, or newly allocated and an address of a location where the data block is stored in the file system.

11. The computer implemented method of claim 1, wherein the data block is one of a plurality of data blocks in the file system.

12. A data processing system for managing a file system, comprising:

a bus system;

storage device connected to the bus system, wherein the storage device includes a set of instructions; and a processing unit connected to the bus system, wherein the processing unit executes the set of instructions to search for each data block in the file system that is owned by an image of the file system in response to a user selecting the image to perform a rollback operation, determine that a data block owned by the image is marked in a first map and a second map, mark the data block in a third map in response to determining that the data block owned by the image is marked in the first map and the second map, allocate a new data block in the file system in response to determining that the data block owned by the image is marked in the third map, and copy data from the data block owned by the image to the new data block in the file system prior to performing the rollback operation to avoid a collision that causes data corruption; wherein the first map is a snapshot owned data block bitmap, the second map is a copy on delete data block bitmap, and the third map is a collision bitmap; and wherein the collision bitmap identifies impending collisions in the file system prior to performance of the rollback operation.

13. The data processing system of claim 12, wherein the processing unit executes a further set of instructions to update a fourth map corresponding to the image to point to the new data block in the file system and a location for the new data block.

14. A computer program product for managing a file system, the computer program product comprising:

a computer usable storage medium having computer usable program code embodied therein, the computer usable storage medium comprising:

computer usable program code configured to search for each data block in the file system that is owned by an image of the file system in response to a user selecting the image to perform a rollback operation;

computer usable program code configured to determine that a data block owned by the image is marked in a first map and a second map;

computer usable program code configured to mark the data block in a third map in response to determining that the data block owned by the image is marked in the first map and the second map;

computer usable program code configured to allocate a new data block in the file system in response to determining that the data block owned by the image is marked in the third map; and computer usable program code configured to copy data from the data block owned by the image to the new data block in the file system prior to performing the rollback operation to avoid a collision that causes data corruption;

wherein the first map is a snapshot owned data block bitmap, the second map is a copy on delete data block bitmap, and the third map is a collision bitmap; and wherein the collision bitmap identifies impending collisions in the file system prior to performance of the rollback operation.

15. The computer program product of claim 14, further comprising: computer usable program code configured to update a fourth map corresponding to the image to point to the new data block in the file system and a location for the new data block.

16. The computer program product of claim 14, further comprising: computer usable program code configured to initialize the first map, the second map, and the third map in memory;

computer usable program code configured to mark data blocks owned by the image in the first map; and computer usable program code configured to mark copy on delete data blocks in the second map.

* * * * *